(12) United States Patent
Kusky

(10) Patent No.: US 10,322,684 B2
(45) Date of Patent: Jun. 18, 2019

(54) VEHICLE INTERIOR PANEL WITH SEALED PERFORATIONS

(71) Applicant: Faurecia Interior Systems, Inc., Auburn Hills, MI (US)

(72) Inventor: Bradley Kusky, Swartz Creek, MI (US)

( * ) Notice: Subject to any disclaimer, the term of this patent is extended or adjusted under 35 U.S.C. 154(b) by 65 days.

(21) Appl. No.: 15/379,189

(22) Filed: Dec. 14, 2016

(65) Prior Publication Data

US 2018/0162293 A1    Jun. 14, 2018

(51) Int. Cl.

| | | |
|---|---|---|
| *B32B 7/08* | (2019.01) | |
| *B60R 13/02* | (2006.01) | |
| *B60R 21/045* | (2006.01) | |
| *B32B 5/20* | (2006.01) | |
| *B32B 3/26* | (2006.01) | |
| *B32B 3/10* | (2006.01) | |
| *B29C 44/12* | (2006.01) | |
| *B32B 37/12* | (2006.01) | |
| *B29L 31/30* | (2006.01) | |
| *B29K 75/00* | (2006.01) | |
| *B29K 105/20* | (2006.01) | |
| *B29K 509/08* | (2006.01) | |
| *B29K 623/00* | (2006.01) | |
| *B29C 44/14* | (2006.01) | |
| *B29K 105/12* | (2006.01) | |

(52) U.S. Cl.
CPC ...... *B60R 13/0256* (2013.01); *B29C 44/1261* (2013.01); *B32B 3/10* (2013.01); *B32B 3/266* (2013.01); *B32B 5/20* (2013.01); *B60R 21/045* (2013.01); *B29C 44/1247* (2013.01); *B29C 44/1257* (2013.01); *B29C 44/145* (2013.01); *B29K 2075/00* (2013.01); *B29K 2105/12* (2013.01); *B29K 2105/20* (2013.01); *B29K 2509/08* (2013.01); *B29K 2623/12* (2013.01); *B29K 2995/0097* (2013.01); *B29L 2031/3008* (2013.01); *B29L 2031/3041* (2013.01); *B32B 7/08* (2013.01); *B32B 37/1284* (2013.01); *B32B 2605/003* (2013.01); *B32B 2605/08* (2013.01)

(58) Field of Classification Search
CPC ... Y10T 428/24431; B32B 7/08; B60R 13/02; B29C 44/351; B29C 65/62
See application file for complete search history.

(56) References Cited

U.S. PATENT DOCUMENTS

| | | | |
|---|---|---|---|
| 7,851,039 B2 | 12/2010 | Boinais et al. | |
| 2010/0068425 A1* | 3/2010 | Boinais | B29C 44/146 428/32 |

(Continued)

*Primary Examiner* — Alexander S Thomas
(74) *Attorney, Agent, or Firm* — Reising Ethington P.C.

(57) ABSTRACT

A vehicle interior panel includes a foam layer formed from a liquid foam precursor between a substrate and a visible decorative skin layer that has perforations formed therethrough. In some cases, the perforations are associated with a line of stitching sewn into and through the skin layer. A sealing film is located beneath the skin layer in the perforated region to prevent the liquid foam precursor from leaking through the perforations during foam formation. The sealing film extends beyond the perforated region and into a non-perforated region, in some cases extending substantially over the entire back side of the skin layer. In this manner, the edges of the sealing film do not cause visual blemishes on the visible surface of the decorative skin layer over time.

20 Claims, 3 Drawing Sheets

(56) References Cited

U.S. PATENT DOCUMENTS

2013/0260086 A1* 10/2013 Zellner, Jr. .............. B60R 13/02
428/102
2015/0321449 A1* 11/2015 Filipp ....................... B32B 5/18
428/104

* cited by examiner

VEHICLE INTERIOR PANEL WITH SEALED PERFORATIONS

TECHNICAL FIELD

This disclosure relates to vehicle interior panels and methods of making them and, more particularly, to vehicle interior panels including a backfilled foam layer.

BACKGROUND

Vehicle interior panels sometimes include a layer of foam material sandwiched between a thin decorative layer and an underlying structural layer to provide a composite structure with a cushion-like feel when a vehicle occupant touches and presses on the visible surface of the assembled and installed interior panel. One technique for forming such a foam layer is via introduction of a liquid foam precursor between the desired layers. The foam precursor includes a mixture of liquids formulated to chemically react once distributed between the desired layers. The reaction results in volumetric expansion of the mixture and, finally, in a solid polymeric material with tiny gas voids distributed throughout the material—i.e., a foam material. This technique of foam layer formation is useful when it is desired to form the foam layer in place to avoid the necessity of handling a separate foam layer or avoid the need for a separate adhesive material to attach the foam to the adjacent layers (i.e., the polymer often has good adhesive properties on its own). It is also useful when it is desired to have a foam layer of non-uniform thickness. In some cases, the pressure from the volumetric expansion can be used to help form the final shape of the panel when confined in a mold with the decorative layer pressed against the mold surface by the expanding foam material.

Some decorative layers have perforations formed through their thickness as part of a decorative element for the interior panel. For instance, stitched threads may be sewn through the decorative layer, or the perforations themselves may be provided for aesthetic purposes. Introducing a liquid foam precursor between two layers of material is problematic when one of the layers includes perforations, as the liquid will sometimes flow into and/or through the perforations, making the foam layer undesirably visible from the decorative side of the panel when finished.

U.S. Pat. No. 7,851,039 to Boinais et al. discloses an interior trim piece that includes a seal element that is applied on the lower surface of a skin layer to help seal stitch holes when a foam layer is subsequently formed there. The seal is applied locally—i.e., only at the location of the stitching where needed to function as a seal—and is sometimes in the form of a tape layer that is applied along a stitched seam.

SUMMARY

In accordance with one embodiment, a vehicle interior panel includes a substrate, a skin layer having a decorative side that faces away from the substrate, a plurality of perforations formed through the skin layer at a perforated region of the skin layer, a foam layer formed between the substrate and the skin layer, and a sealing film disposed between the foam layer and the skin layer. The decorative side of the skin layer is exposed to an interior of a passenger cabin when the panel is installed in a vehicle. The sealing film is continuous along the entire perforated region of the skin layer and extends beyond the perforated region and into a non-perforated region of the skin layer.

The vehicle interior panel may additionally include a line of stitching formed along the skin layer. The line of stitching includes thread that passes through needle holes formed through the skin layer, the plurality of perforations includes the needle holes, and the sealing film is disposed between the thread and the foam layer.

In embodiments in which the vehicle interior panel includes a line of stitching, the sealing film may include one or more edges defining a perimeter of the sealing film such that none of sealing film edges are parallel with the line of stitching.

In embodiments in which the vehicle interior panel includes a line of stitching, a second line of stitching may be formed along the skin layer. The second line of stitching is non-parallel with the other line of stitching and includes thread that passes through needle holes formed through the skin layer. The plurality of perforations further comprises the needle holes along the second line of stitching, and the sealing film is disposed between the thread and the foam layer.

In embodiments in which the vehicle interior panel includes a line of stitching, the line of stitching may lie along a curvilinear path along the skin layer, and the sealing film is free from wrinkles and thickness variations alongside the line of stitching.

The sealing film may extend along the skin layer to cover an entire portion of a back side of the skin layer that is directly opposite a portion of the decorative side of the skin layer that is visible when the panel is installed in the vehicle.

The sealing film may include one or more edges defining a perimeter of the sealing film such that none of the edges lie directly opposite a visible portion of the decorative side of the skin layer.

The sealing film may cover a majority of a back side of the skin layer.

The sealing film and the skin layer may be coextensive.

The sealing film may be directly bonded to the skin layer via lamination with no interposed adhesive layer.

In accordance with one embodiment, a method of making a vehicle interior panel includes the steps of: (a) disposing a liquid foam precursor material between a vehicle interior panel substrate and a decorative skin layer, wherein the decorative skin layer comprises a perforated region within which a plurality of perforations are formed through the skin layer; (b) sealing the perforations with a sealing film before step (a), wherein the sealing film is continuous along the entire perforated region and extends beyond the perforated region and into a non-perforated region of the decorative skin layer; and (c) forming a foam layer between the substrate and the skin layer from the foam precursor material, wherein the foam precursor material undergoes volumetric expansion and is prevented from passing through the perforations by the sealing film.

At least some of the perforations may be needle holes that lie along a line of stitching formed along the skin layer before step (a).

In embodiments in which a line of stitching is formed along the skin layer, at least some of the perforations may be needle holes that lie along a second line of stitching formed along the skin layer before step (a), such that the lines of stitching are non-parallel.

In embodiments in which a line of stitching is formed along the skin layer, the line of stitching may lie along a curvilinear path such that the sealing film is free from wrinkles and thickness variations along the line of stitching.

The sealing film may extend along the skin layer to cover an entire portion of a back side of the skin layer that is directly opposite a visible portion of the decorative side of the skin layer.

Within the scope of this application it is contemplated that the various aspects, embodiments, examples, features and alternatives set out in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF ILLUSTRATIVE EMBODIMENT(S)

As described below, various embodiments of a vehicle interior panel include a sealing film that prevents a liquid foam precursor material from leaking through perforations, such as needle holes, in a skin layer of the panel during foam formation. Unconventionally, the sealing film extends beyond a perforated region and into a non-perforated region of the skin layer where its presence is not necessary to seal perforations. It has now been determined that extending the sealing layer beyond the perforated region of the skin layer can provide several additional advantages, such as prevention of visual defects at the decorative side of the skin layer and ease of manufacturing.

Figure 1:
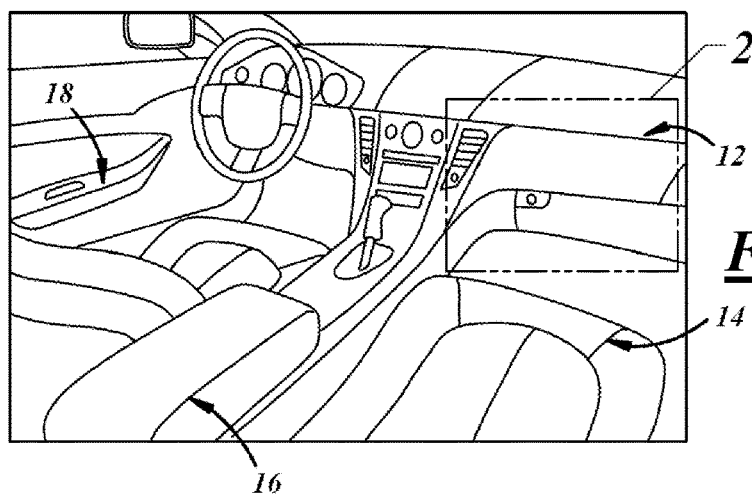
FIG. 1 is a perspective view of the interior of a vehicle passenger cabin showing examples of vehicle interior panels.

With reference to FIG. 1, a vehicle interior is illustrated with various examples of vehicle interior panels that can include skin layers overlying back-filled foam materials, including an instrument panel assembly 12, a seat assembly 14, a console assembly 16, and a door panel assembly 18. The arrows in the figure also point to example locations for seams and/or stitching for each of the components. The layered vehicle interior panel constructions and methods disclosed herein may be used with other interior components as well, such as steering wheel assemblies, shifter assemblies, etc.

Figure 2:
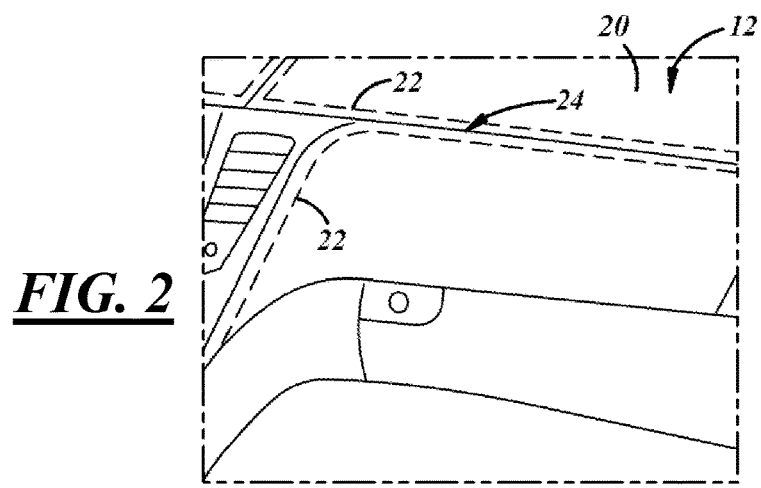
FIG. 2 is an enlarged view of a portion of one of the interior panels of FIG. 1 including lines of stitching.

FIG. 2 is an enlarged view of a portion of the instrument panel assembly 12 of FIG. 1. The illustrated instrument panel 12 includes a visible decorative covering 20 and one or more lines of stitching 22. Each line of stitching 22 may be functional and/or decorative and may form part of a seam 24. Functional stitching holds two distinct pieces of material together at a seam. Decorative stitching is visible stitching formed as part of the vehicle interior aesthetic. Functional stitching is considered decorative when visible in this manner, but some stitching is purely decorative (i.e., non-functional). For instance, a line of stitching 22 may be sewn through a flat piece of fabric to provide the illusion of a functional seam or that the fabric is sewn to some other layer therebeneath. Each line of stitching 22 includes a length of thread sewn through the covering 20 with the thread passing through needle holes. As used herein, the term "line" encompasses both rectilinear and curvilinear paths along the covering 20.

Figure 3:
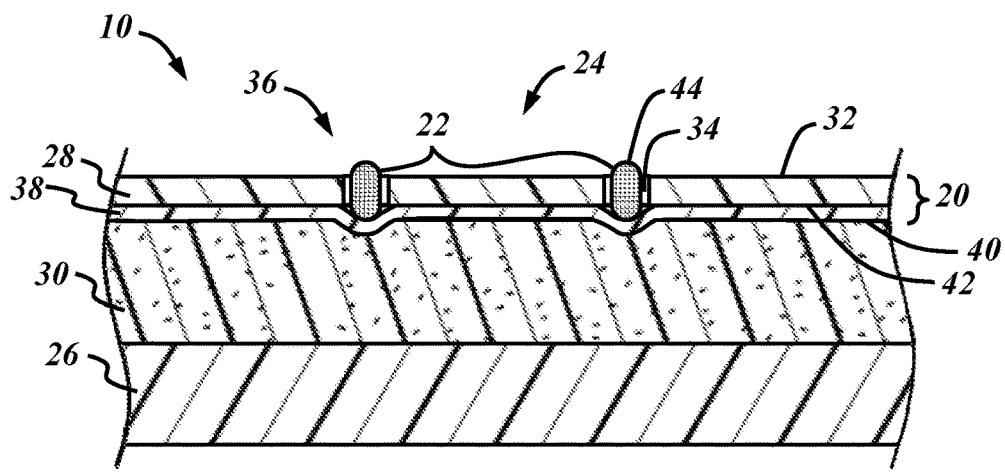
FIG. 3 is a cross-sectional view of a portion of an illustrative vehicle interior panel including a sealing film between a foam layer and a skin layer.

FIG. 3 is a cross-sectional view of a portion of a vehicle interior panel 10, including a substrate 26, a skin layer 28, and a back-filled foam layer 30 formed between the substrate and the skin layer. The skin layer 28 is the portion of the decorative covering 20 that is visible in an interior of the vehicle passenger cabin when the panel 10 is installed in the vehicle and has a decorative side 32 that faces away from the substrate 26. A plurality of perforations 34 is formed through the skin layer 28 at a perforated region 36 of the skin layer, and a sealing film 38 is disposed between the foam layer 30 and the skin layer. In this example, the skin layer 28 and the sealing film 38 are the only layers of the decorative covering 20, but there may be additional layers therebetween.

The substrate 26 is a structural component that provides support for the overlying layers as well as attachment points for securing the panel 10 to the vehicle structure. The substrate 26 may be made from an injection molded thermoplastic material such as glass-filled polypropylene or from any other suitable material, including other polymeric, metallic, or composite materials. A typical non-limiting thickness for a polymer-based substrate is about 3 mm. The skin layer 28 is a relative thin layer of material provided primarily for its desirable appearance and tactile characteristics. Typical skin layer materials include leather or polymeric materials provided in sheet-like form with generally uniform thickness. These materials are typically sufficiently thin and flexible that they cannot support their own weight if supported only at an edge of the sheet with its planar opposite faces oriented horizontally. In one example, the skin layer 28 is a sheet of thermoplastic olefin (TPO) or TPO-based material having a thickness in a range from about 0.4 mm to about 1.0 mm. Other examples of skin layer materials include polyurethane, thermoplastic polyurethane, vinyl materials (e.g., PVC), and simulated leather materials such as Naugahyde®.

The foam layer 30 is provided as a cushioning layer between the flexible skin layer 28 and the more rigid substrate 26. The foam layer 30 is referred to as "back-filled" in reference to the process by which it is produced. A back-fill foam process generally includes disposing a reactive liquid precursor material between the desired two components—the substrate 26 and skin layer 28 in this case. The liquid precursor material is allowed to flow between the two components where it reacts to expand into a foam material comprising a polymeric material with gas bubbles or voids formed throughout. The decorative side 32 of the skin layer 28 may be supported against a mold surface of the desired final shape during this expansion reaction so that, when the foam material cures, this desired final shape is retained in the shape of the skin layer. The process may also be referred to as foam-in-place to distinguish the foam layer from pre-formed foam layers that can be stacked between desired components for cushioning. Back-filled foam layers are typically polyurethane materials, but it is possible to form the foam layer 30 from other expandable polymeric formulations or liquid pre-cursor materials. The thickness of the foam layer may be anywhere from about 1.0 mm to about 10 mm, depending on the panel geometry and/or desired amount of cushioning.

The sealing film 38 provides at least a portion of a back side 40 of the decorative covering 20 and in this case is attached to a back side 42 of the skin layer 28. The sealing film 38 is also a relatively thin layer of material provided primarily to prevent the above-described liquid pre-cursor material that flows and expands between the substrate 26 and the skin layer 28 from leaking through the perforations 34 and becoming visible at the decorative side 32. In order to serve its purpose, the sealing film 38 must therefore be present at each of the perforations 34 and is thus considered to be present along the entire perforated region 36. It has been found that extending the sealing film 38 beyond the perforated region and into a non-perforated region of the skin layer 28 comes with certain advantages, as discussed further below. The sealing film 38 may be laminated to and in direct contact with the back side 42 of the skin layer 28 without the need for or presence of an additional adhesive material. Suitable materials from the sealing film 38 include polymeric films such as TPU film or polyester film. These materials have been found to have suitable impermeability to foam-producing liquid precursor materials, good lamination adherence to various skin layer materials, and at least partial conformance to the shape of the thread 44 running along the back side 42 of the skin layer. The thickness of the sealing film 38 may range from 0.1 mm to 1.0 mm. The thickness of the sealing film 38 is preferably less than the thickness of the skin layer 28 to help prevent the material characteristics of the sealing film from negating desirable material characteristics (e.g., flexibility) of the skin layer.

As illustrated, a line of stitching 22 may be formed along the skin layer 28 as part of the decorative covering 20. In this example, two parallel lines of decorative stitching 22 cooperate to form a simulated seam or sewn joint 24 appearing at the decorative side 32 of the skin layer 28. Each line of stitching 22 includes thread 44 that passes through the perforations 34, which are needle holes in this embodiment, formed through the skin layer 28. The sealing film 38 is applied after the lines of stitching 22 are sewn along the skin layer 28 such that the sealing film is disposed between the thread 44 and the foam layer 30 in the finished panel 10. In other embodiments, the line of stitching is omitted and/or the perforated region 36 includes perforations 34 that are not needle holes and not associated with a line of stitching.

Figure 4:
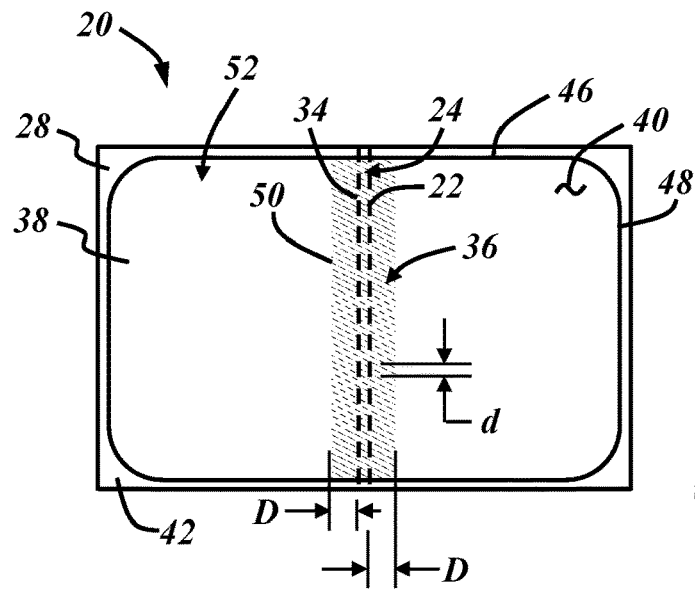
FIG. 4 is a plan view of a back side of an illustrative decorative covering including a sealing film at a perforated region and extending into a non-perforated region.

FIG. 4 is a plan view of the back side 40 of an exemplary covering 20 that includes the skin layer 28 with parallel lines of stitching 22 sewn along and through it and an exemplary sealing film 38 applied over all of the perforations 34 of the perforated region 36 formed by the sewing operation. The perforated region 36 is schematically illustrated with crosshatching. The sealing film 38 is one continuous piece and includes one or more edges 46 that define a perimeter 48 of the sealing film 38.

The perforated region 36 of the skin layer 28 is defined within a boundary 50 in the following manner. First, the perforated region 36 includes all of the perforations 34 that require sealing. In other words, the perforated region 36 includes all of the perforations 34 having the material of the foam layer 30 located directly therebeneath in the finished panel. These are the relevant perforations 34 and are considered as a single group. This is to say that there may be perforations 34 through excess material near the outer edges of the skin layer 28 that will not be subjected to the foam precursor material during foam layer formation. Such perforations are of no consequence and not considered to be part of the perforated region 36 as that term is used herein. Next, the minimum distance d between adjacent perforations is determined. In the case of a line of stitching, this is the distance between consecutively formed needle holes, as shown, or the effective length of a single stitch. In the case of a skin layer 28 such as perforated leather in which the perforations are made in a uniform decorative pattern, the distance d is simply the smallest distance between any two individual perforations. Finally, the distance d is doubled to determine a boundary distance D. The boundary 50 of the perforated region 36 is defined at the outward distance D from the outermost (i.e., nearest the outer edges of the skin layer) of the group of relevant perforations. In the case of the parallel lines of stitching 22 in FIG. 4, the boundary 50 of the perforated region is thus defined at the distance D from both opposite sides of the simulated seam 24 as measured in a direction away from the center of the seam. The area of the skin layer 28 inside the boundary 50 is the perforated region 36, and the area outside the boundary 50 is a non-perforated region 52.

As noted above, it has been determined that extending the sealing film 38 beyond the perforated region 36 and into the non-perforated region 52, where its presence as a perforation sealing element is not necessary, results in certain advantages. For example, if the sealing film 38 merely covers the back side of the perforations 34 and lies only within the perforated region of the skin layer 28, the location of the edges 46 can become apparent at the decorative side of the covering 20 as witness marks, which are undesirable visual defects. In other words, the covering 20 has an abrupt thickness transition at the edges 46 of the sealing film 38; the thickness on one side of the edges 46 where the film 38 is present is the sum of the thicknesses of the film 38 and the skin layer 28, while the thickness on the opposite side of the edges 46 where the film 38 is not present is equal to the thickness of the skin layer only. While the transition is not visually as abrupt at the decorative side of the covering 20 as on the back side 40, it can become noticeable along an otherwise smooth visible side of the skin layer 28, especially over time and with increased temperatures when polymer or polymer-based materials are used in the skin layer due to creep or stress-relaxation. Such undesirable witness marks may become particularly noticeable when the edges 46 of the film are in close proximity to the lines of stitching 22 which, as decorative elements of the vehicle interior, tend to attract a viewer's attention to the immediate area of the stitching.

Extension of the sealing film 38 into the non-perforated region 52 of the skin layer 28 as taught herein can lessen or remove the noticability of any witness marks and/or eliminate them altogether. In the example of FIG. 4, the sealing film 38 extends beyond the perforated region 36 and into the non-perforated region 52 such that the edges 46 of the film are near the outer edges of the skin layer 28. In this example, the outer portion of the covering with no sealing film 38 may be excess covering material that is tucked or folded beneath the substrate when installed in the vehicle, or it may be material that is used to handle the covering 20 during other manufacturing operations such as the foam back-fill process. In one embodiment, the sealing film 38 extends along the skin layer 28 to cover an entire portion of the back side 42 of the skin layer that is directly opposite a portion of the decorative side 32 of the skin layer that is visible when the panel is installed in the vehicle.

Figure 5:
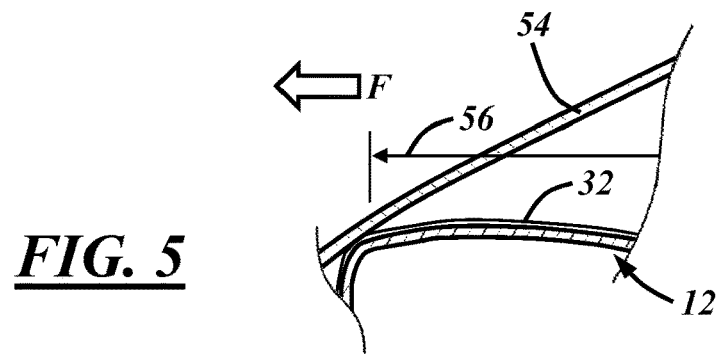
FIG. 5 is a partial cross-sectional view of an instrument panel illustrating a portion of the decorative side of the panel that is visible when installed in the vehicle.

This is illustrated schematically in FIG. 5, which represents a side cross-sectional view of a front portion of the passenger cabin of the vehicle where an exemplary instrument panel 12 meets the lower part of a vehicle windshield 54. In this example, the portion 56 of the decorative side 32 of the skin layer that is visible when the panel is installed in the vehicle extends generally horizontally from some location in the interior of the passenger cabin in a direction F toward the front of the vehicle, ending where the panel 12 meets the windshield 54. The sealing film may thus extend along the skin layer to cover an entire portion of the back side of the skin layer that is directly opposite the portion 56 of the decorative side 32 of the skin layer that is visible when the panel is installed in the vehicle—which in this example means at least to the windshield. In this manner, the edge of the sealing film is located so that any witness mark due to the presence of the sealing film is not visible from the decorative side of the covering. In one embodiment, the sealing film 38 covers the entire back side 42 of the skin layer 28—i.e., the skin layer 28 and sealing film 38 are coextensive.

These embodiments highlight yet another advantage of extending the sealing film 38 into the non-perforated region 52 of the skin layer 28, which is decreased sensitivity to the position and/or orientation of the sealing film 38 during application of the sealing film. In other words, if the sealing film 38 was provided as high aspect ratio tape (e.g., a length-to-width ratio greater than 5) having a width just large enough to cover the two parallel lines of needle holes in FIG. 4, the accuracy of film placement with respect to the seam 24 is very critical for the sealing film to be able to perform its sealing function. Widening the film out away from the seam 24 and into the non-perforated region 52 reduces the importance of the location of the sealing film and thus provides a larger processing window. Indeed, a sealing film 38 that is coextensive with the skin layer 28 altogether eliminates the relative location of the sealing film to the perforations 34 as a process variable.

Figure 6:
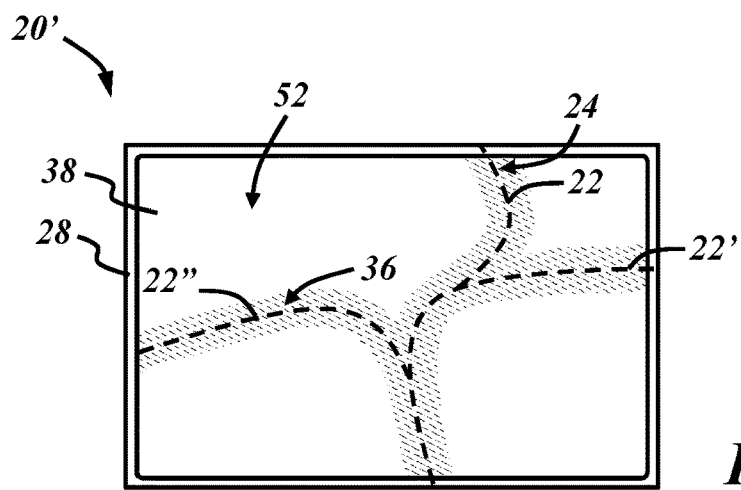
FIG. 6 is a plan view of the back side of a decorative covering including a sealing film and multiple lines of non-parallel stitching.

FIG. 6 illustrates another example of a decorative covering 20' including the sealing film 38 and highlights other features and advantages. The example of FIG. 6 includes first, second, and third lines of stitching 22, 22', 22". A line of stitching is considered distinct from another line of stitching if both lines cannot be sewn along a single needle path. In this example, each line of stitching is non-parallel with each of the other lines of stitching. As with the previous example of FIG. 4, the sealing film 38 is provided in one continuous piece along the entire perforated region 36 and extends into the non-perforated region(s) 52. Another feature illustrated in FIG. 6 is that each of the lines of stitching 22, 22', 22" is curvilinear (as opposed to rectilinear).

These features highlight several other advantages over sealing films such as sealing tapes that are applied locally only at the seam or seams 24. For instance, when the sealing film 38 is configured to extend beyond the perforated region 36, it can be made as a single piece so that location and/or application of the film 38 can be performed in a single operation. This in contrast to a sealing film in tape form which would require at least three separate lengths of tape to cover all of the perforations in the perforated region 36. Additionally, when the sealing film 38 is configured to extend beyond the perforated region 36, it can be made as a single piece in nearly any shape to cover all of the perforations in any perforated region that is based on a curvilinear line of stitching. This in contrast to a sealing film in tape form which would require attempts by man or machine to "turn corners" with a piece of tape. This is problematic because the outside of a turn is longer than the inside of a turn, and any film in tape form will therefore wrinkle or bunch-up and not lie flat on the back side of the skin layer. This causes even more severe thickness variations in the covering that are associated with the sealing film potentially leading to even more noticeable witness marks on the decorative side of the finished panel. Sealing tape may also require the use of multiple shorter individual pieces of sealing tape along a curvilinear line of stitching, increasing the number of pieces and time required to apply the seal. Any overlap in the consecutively applied individual pieces is another source of thickness variation.

Figure 7:
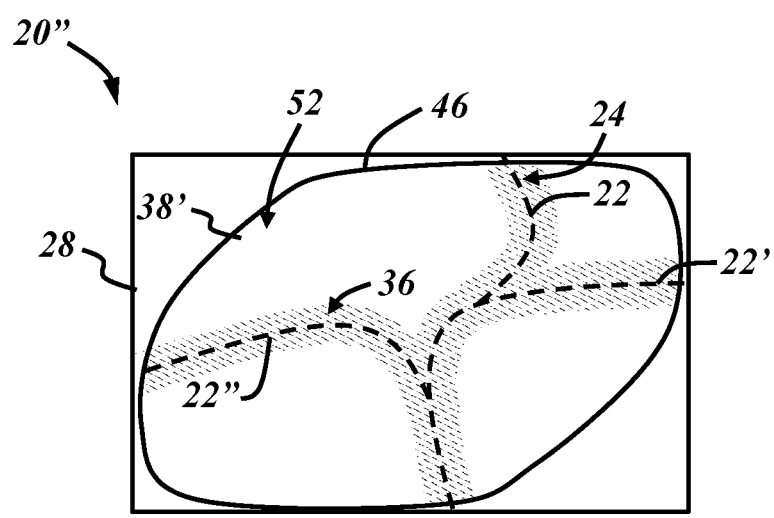
FIG. 7 is a plan view of the decorative covering of FIG. 6 with a differently configured sealing film.

FIG. 7 illustrates an example of the decorative covering 20" with the skin layer 28 and lines of stitching 22, 22', 22" of FIG. 6 with a differently configured sealing film 38'. As in the example of FIG. 6, the sealing film 38' is applied as a single continuous piece that overlaps the entire perforated region 36 and all of the perforations therein. This of course could not be done with a sealing element in tape form without multiple pieces, additional thickness variations in the perforated region 36, and/or wrinkles in the applied seal. Even if a tape-like seal could bend along a curvilinear line of stitching or trace multiple non-parallel lines of stitching without wrinkling or without the use of multiple individual pieces, this and other examples of the sealing film 38' offers the additional advantage that the edge(s) 46 of the film extending into the non-perforated region 52 are also curvilinear and non-parallel with the seams 24 or lines of stitching 22, 22', 22". The additional advantage associated with the non-parallel edge 46 of the film 38 is that, even if a witness mark appears on the visible surface of the decorative skin layer 26 in the finished panel, it is not readily apparent or noticeable to the viewer because it is away from the seam and does not follow the same contour that the viewer's eye normally follows—i.e., the line of stitching. This version of the sealing film 38' also uses less film material and again highlights the fact that the film 38' and skin layer 28 do not necessarily have to be coextensive to realize the benefits of extending the film into the non-perforated region.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel, comprising:

a substrate;

a skin layer having a decorative side that faces away from the substrate and is exposed to an interior of a passenger cabin when the panel is installed in a vehicle;

a plurality of perforations formed through the skin layer at a perforated region of the skin layer;

a foam layer formed between the substrate and the skin layer;

a sealing film disposed between the foam layer and the skin layer, the sealing film being continuous along the entire perforated region of the skin layer and extending beyond the perforated region and into a non-perforated region of the skin layer; and a line of stitching formed along the skin layer, the line of stitching comprising thread that passes through needle holes formed through the skin layer, wherein the plurality of perforations comprises the needle holes and the sealing film is disposed between the thread and the foam layer, wherein the sealing film extends along the skin layer to cover an entire portion of a back side of the skin layer that is directly opposite a portion of the decorative side of the skin layer that is visible when the panel is installed in the vehicle, and wherein no edge of a perimeter of the sealing film is parallel with the line of stitching.

2. A vehicle interior panel as defined in claim 1, wherein no edge of the perimeter of the sealing film lies directly opposite said visible portion of the decorative side of the skin layer.

3. A vehicle interior panel, comprising:

a substrate;

a skin layer having a decorative side that faces away from the substrate and is exposed to an interior of a passenger cabin when the panel is installed in a vehicle;

a plurality of perforations formed through the skin layer at a perforated region of the skin layer;

a foam layer formed between the substrate and the skin layer; and a sealing film disposed between the foam layer and the skin layer, the sealing film being continuous along the entire perforated region of the skin layer and extending beyond the perforated region and into a non-perforated region of the skin layer, wherein no edge of a perimeter of the sealing film lies directly opposite a visible portion of the decorative side of the skin layer.

4. A vehicle interior panel as defined in claim 3, further comprising a line of stitching formed along the skin layer, the line of stitching comprising thread that passes through needle holes formed through the skin layer, wherein the plurality of perforations comprises the needle holes.

5. A vehicle interior panel as defined in claim 4, wherein no edge of the perimeter of the sealing film is parallel with the line of stitching.

6. A vehicle interior panel as defined in claim 4, further comprising a second line of stitching formed along the skin layer, the second line of stitching being non-parallel with the other line of stitching and comprising thread that passes through needle holes formed through the skin layer, wherein the plurality of perforations further comprises the needle holes along the second line of stitching.

7. A vehicle interior panel as defined in claim 4, wherein the line of stitching lies along a curvilinear path along the skin.

8. A vehicle interior panel as defined in claim 3, further comprising a line of stitching formed along the skin layer, the line of stitching comprising thread that passes through needle holes formed through the skin layer, wherein the plurality of perforations comprises the needle holes and the sealing film is disposed between the thread and the foam layer.

9. A vehicle interior panel as defined in claim 8, wherein the line of stitching lies along a curvilinear path along the skin layer, and the sealing film is free from wrinkles and thickness variations alongside the line of stitching.

10. A vehicle interior panel as defined in claim 3, wherein the sealing film covers a majority of a back side of the skin layer.

11. A vehicle interior panel as defined in claim 3, wherein the sealing film and the skin layer are coextensive.

12. A vehicle interior panel as defined in claim 3, wherein the sealing film is directly bonded to the skin layer via lamination with no interposed adhesive layer.

13. A vehicle interior panel as defined in claim 4, wherein the sealing film is disposed between the thread and the foam layer.

14. A vehicle interior panel, comprising:

a substrate;

a skin layer having a decorative side that faces away from the substrate and is exposed to an interior of a passenger cabin when the panel is installed in a vehicle;

a plurality of perforations formed through the skin layer at a perforated region of the skin layer;

a foam layer formed between the substrate and the skin layer; and a sealing film disposed between the foam layer and the skin layer, the sealing film being continuous along the entire perforated region of the skin layer and extending beyond the perforated region and into a non-perforated region of the skin layer, wherein the sealing film is directly bonded to the skin layer via lamination with no interposed adhesive layer, wherein the perforated region of the skin layer is defined as an area inside a boundary and includes all of the perforations that have the foam layer located directly therebeneath, the boundary being defined at an outward distance from the outermost of the perforations that have the foam layer located directly therebeneath, wherein the outward distance is twice a minimum distance between adjacent perforations that have the foam layer located directly therebeneath.

15. A vehicle interior panel as defined in claim 14, wherein the sealing film covers a majority of a back side of the skin layer.

16. A vehicle interior panel as defined in claim 14, wherein the sealing film and the skin layer are coextensive.

17. A vehicle interior panel as defined in claim 14, wherein the sealing film is directly bonded to the skin layer via lamination with no interposed adhesive layer.

18. A vehicle interior panel as defined in claim 14, further comprising a line of stitching formed along the skin layer, the line of stitching comprising thread that passes through needle holes formed through the skin layer, wherein the plurality of perforations comprises the needle holes.

19. A vehicle interior panel as defined in claim 18, wherein said minimum distance between adjacent perforations is the distance between consecutively formed needle holes.

20. A vehicle interior panel as defined in claim 18, wherein the line of stitching lies along a curvilinear path along the skin layer.

* * * * *